United States Patent
Pomaranski et al.

(10) Patent No.: US 7,222,246 B2
(45) Date of Patent: May 22, 2007

(54) METHOD FOR DETERMINING NUMBER OF DYNAMICALLY TEMPERATURE-ADJUSTED POWER SUPPLY UNITS NEEDED TO SUPPLY POWER ACCORDING TO MEASURE OPERATING TEMPERATURE OF POWER SUPPLY UNITS

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 10/672,119

(22) Filed: Sep. 26, 2003

(65) Prior Publication Data

US 2005/0071691 A1    Mar. 31, 2005

(51) Int. Cl.
*G06F 1/26* (2006.01)
(52) U.S. Cl. ........................... 713/300; 714/14
(58) Field of Classification Search ................. 713/300; 714/14
See application file for complete search history.

(56) References Cited

U.S. PATENT DOCUMENTS

| | | | |
|---|---|---|---|
| 4,204,249 A * | 5/1980 | Dye et al. ................... | 713/330 |
| 5,590,061 A * | 12/1996 | Hollowell et al. .......... | 702/130 |
| 5,909,583 A * | 6/1999 | Hayes et al. ................ | 713/300 |
| 6,153,946 A | 11/2000 | Koch et al. | |
| 6,301,133 B1 * | 10/2001 | Cuadra et al. .............. | 363/65 |
| 6,418,557 B1 | 7/2002 | Otani | |
| 6,434,236 B1 | 8/2002 | Zorzella | |
| 6,448,672 B1 * | 9/2002 | Voegeli et al. ............. | 307/52 |
| 6,477,483 B1 | 11/2002 | Scarlat et al. | |
| 6,504,266 B1 * | 1/2003 | Ervin ......................... | 307/29 |
| 6,664,657 B2 * | 12/2003 | Hailey ........................ | 307/52 |
| 6,735,704 B1 * | 5/2004 | Butka et al. ................ | 713/300 |
| 6,785,827 B2 * | 8/2004 | Layton et al. ............. | 713/300 |
| 6,792,550 B2 * | 9/2004 | Osecky et al. ............. | 713/300 |
| 6,915,441 B2 * | 7/2005 | Maciorwski et al. ...... | 713/340 |
| 7,043,648 B2 * | 5/2006 | Tokunaga ................... | 713/320 |
| 7,127,625 B2 * | 10/2006 | Farkas et al. ............... | 713/320 |

* cited by examiner

*Primary Examiner*—Chun Cao

(57) ABSTRACT

One embodiment disclosed relates to a method of providing dynamic temperature-adjusted power redundancy for a system. Tracking is performed of the number of power supply units, n, that are presently in an up state. The temperature in which the power supply units are operating is measured, and a temperature-adjusted number of power supply units, N, which are presently needed to supply power to the system, is dynamically determined.

20 Claims, 5 Drawing Sheets

METHOD FOR DETERMINING NUMBER OF DYNAMICALLY TEMPERATURE-ADJUSTED POWER SUPPLY UNITS NEEDED TO SUPPLY POWER ACCORDING TO MEASURE OPERATING TEMPERATURE OF POWER SUPPLY UNITS

BACKGROUND OF THE INVENTION

1. Field of the Invention

The present invention relates generally to power supplies for electronics and computers.

2. Description of the Background Art

Supplying power with back-up or redundancy to computer systems or servers is desirable or required in certain applications. For example, it is becoming increasingly more important to provide mechanisms that minimize unscheduled "down time" in data centers. The term "high availability" (HA) computing is often used to refer to computer systems that include these mechanisms.

HA mechanisms are provided at many levels. For example, a data center may have redundant computer systems so that if one system fails, the workload can be seamlessly shifted to another system. In addition, data may be stored in a disk array subsystem that allows any single disk drive to fail without affecting the ability of the disk array subsystem to continue operating.

One of the most important aspects of HA computing is ensuring that computer circuits receive an uninterrupted supply of DC power. Typically, a loss of DC power is caused by a loss of AC power to the AC-to-DC power supplies, or a failure of an AC-to-DC power supply. Uninterruptible AC power supplies address the problem of AC power loss by providing a constant supply of AC power to AC-to-DC power supplies. Typically, uninterruptible power supplies are implemented using rechargeable batteries, and in some cases, generators.

Redundant AC-to-DC power supplies address the problem of AC-to-DC power supply failure. In the prior art, redundant power supplies have been deployed on a "per system" basis. Typically, one redundant power supply is provided for each system, which is known in the art as "N+1" redundancy.

Computer systems also use DC-DC conversion since in many cases it is more efficient to provide AC-DC conversion to a single high DC voltage (typically 48V), then bus this voltage to second stage down-converters. In many cases, these DC-DC conversion devices are also required to be redundant.

SUMMARY

One embodiment of the invention pertains to a method of providing dynamic temperature-adjusted power redundancy for a system. Tracking is performed of the number of power supply units, n, that are presently in an up state. The temperature in which the power supply units are operating is measured, and a temperature-adjusted number of power supply units, N, which are presently needed to supply power to the system, is dynamically determined.

Another embodiment of the invention pertains to an apparatus for providing power redundantly to a system. Multiple power supply units are configured to provide power to the system. A temperature sensor is configured to measure a temperature in which the power supply units are operating. Logic circuitry is configured to use the measured temperature to dynamically calculated a temperature-adjusted number of power supply units, N, that are presently needed to supply power to the system.

DETAILED DESCRIPTION

Figure 1A:
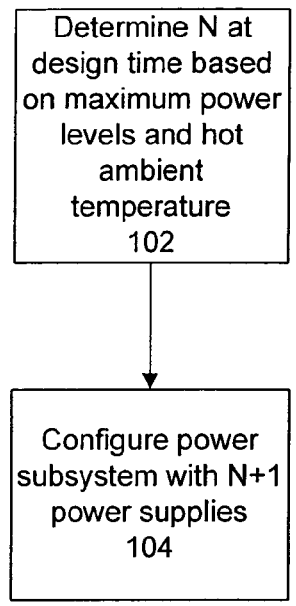
FIG. 1A is a flow chart depicting a typical conventional method of configuring a redundant power system.

Consider an example wherein a redundant power subsystem has multiple power supplies of equivalent power supplying capacity. The power subsystem supports a system of devices. Consider an example wherein the number of power supplies that are up and running is "n", and the system of devices requires "N" power supplies to run without redundancy. If n=N−1, then there is insufficient power to run the system and potential for highly undesirable device failures. On the other hand, if n=N+1, then there is one supply over the minimum needed to run the system. More generally, if n=N+x, then there are "x" supplies over the minimum needed to run the system.

A conventional redundant power system typically has both N and x statically determined during the system design process. Because the power subsystem may conceivably have to accommodate the maximum load of the system, including components that may be added in the future, the power subsystem is typically designed for the worst possible case (highest possible load). In other words, N is typically calculated during design by summing the maximum power of all components that could be in the system.

Another prior technique for determining "N" uses a look-up table (LUT) indexed by the serial number of the devices supported by the power subsystem. The LUT holds a maximum power level drawn by each device. N may then be calculated by summing these maximum power levels, dividing by the power level supplied per power supply, and rounding up to the next nearest number.

The number of redundant power supplies "x" is typically determined at design time based on cost, space and uptime considerations. Usually, because of board real estate and cost considerations, the power subsystem is designed only as N+1 (i.e. with x=1).

Applicants believe that the above-described conventional power subsystems have substantial disadvantages. First, because of overly conservative assumptions, the power system is typically over-designed at high cost (both in terms of space and expense). The assumptions are overly conservative since components do not generally draw maximum power at all times, and, in many cases, the system is not fully loaded. Second, because the statically-determined N overestimates the actual power requirements of the system, there is typically an over-reporting of n=N states.

Regarding the latter, an n=N condition indicates that the system is being run with sufficient power, but without an extra available supply for redundancy. Such a condition occurs, when a power subsystem loses one or more power supply(ies) due to some type of failure such that the subsystem isrunning with only N working supplies. If, as typical, x=1, then the system will report an n=N condition when a single power supply fails or otherwise becomes unavailable.

When the power subsystem is running at n=N, action is due in order to gain the redundancy back. The reason that redundancy needs to be restored when n=N is that, otherwise, the loss of one more supply (i.e. the transition from n=N to n=N-1) may result in system crashes and/or data corruption, both of which are to be avoided at nearly any cost in mission critical environments.

In a computer system (for example, at a data center), the restoration to an n>N state is typically accomplished by either (a) temporarily shutting down the system to fix or change the failing component (cold swapping) or (b) performing some type of hot swap operation to replace the failing power component while the system remains online (i.e. is kept running with power). Either of these two procedures, while better than a system crash or data corruption, still requires some form of human intervention. Human intervention disadvantageously incurs costs. In addition, the former procedure (where the system is temporarily shut down) reduces uptime of the system and is hence quite undesirable. Therefore, the occurrence of an n=N condition is generally disadvantageous.

FIG. 1A is a flow chart depicting a typical conventional method of configuring a redundant power system. The number of supplies to run the system without redundancy, N, is determined 102 at design time based on conservative assumptions of maximum power needs and an assumption of a hot ambient temperature, since a system must be designed to work in worst case conditions. Unfortunately, this philosophy 'punishes' those that run systems in cool data centers Thereafter, the power subsystem is configured 104 with N+1 power supplies to provide a level of redundancy. More generally, N+x power supplies could be configured, but typically N+1 supplies are configured due to space and cost considerations.

Figure 1B:
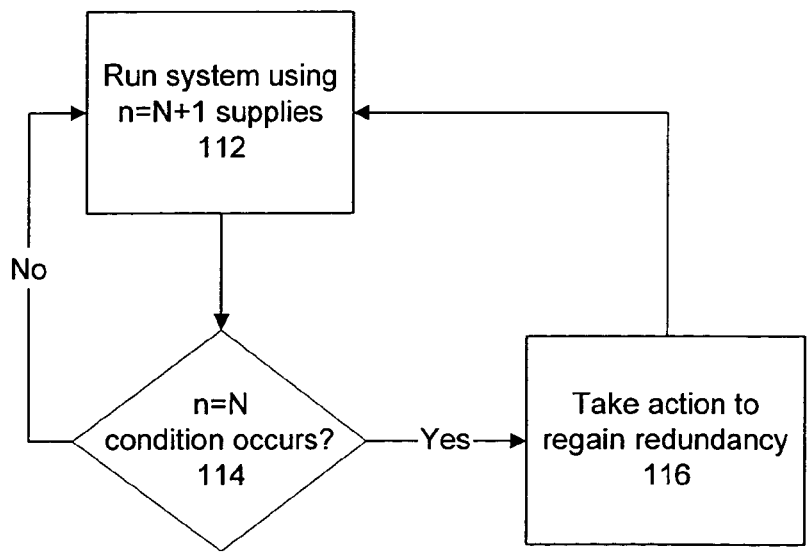
FIG. 1B is a flow chart depicting a conventional method of operating and maintaining a power subsystem with the typical N+1 redundancy.

FIG. 1B is a flow chart depicting a conventional method of operating and maintaining a power subsystem with the typical N+1 redundancy. Per FIG. 1A, the system is configured to normally run 112 using n=N+1 power supplies. If no supplies fail and so no n=N conditions occur 114, then the system continues to run 112 with n=N+1 supplies. However, if a supply fails so that an n=N condition occurs 114, then an action 116 is taken to restore the redundancy. As described above, the action 116 may comprise either cold or hot swapping of a failed component or supply. Thereafter, N+1 redundancy is restored, and the system again runs 112 with a level of redundancy.

Figure 2:
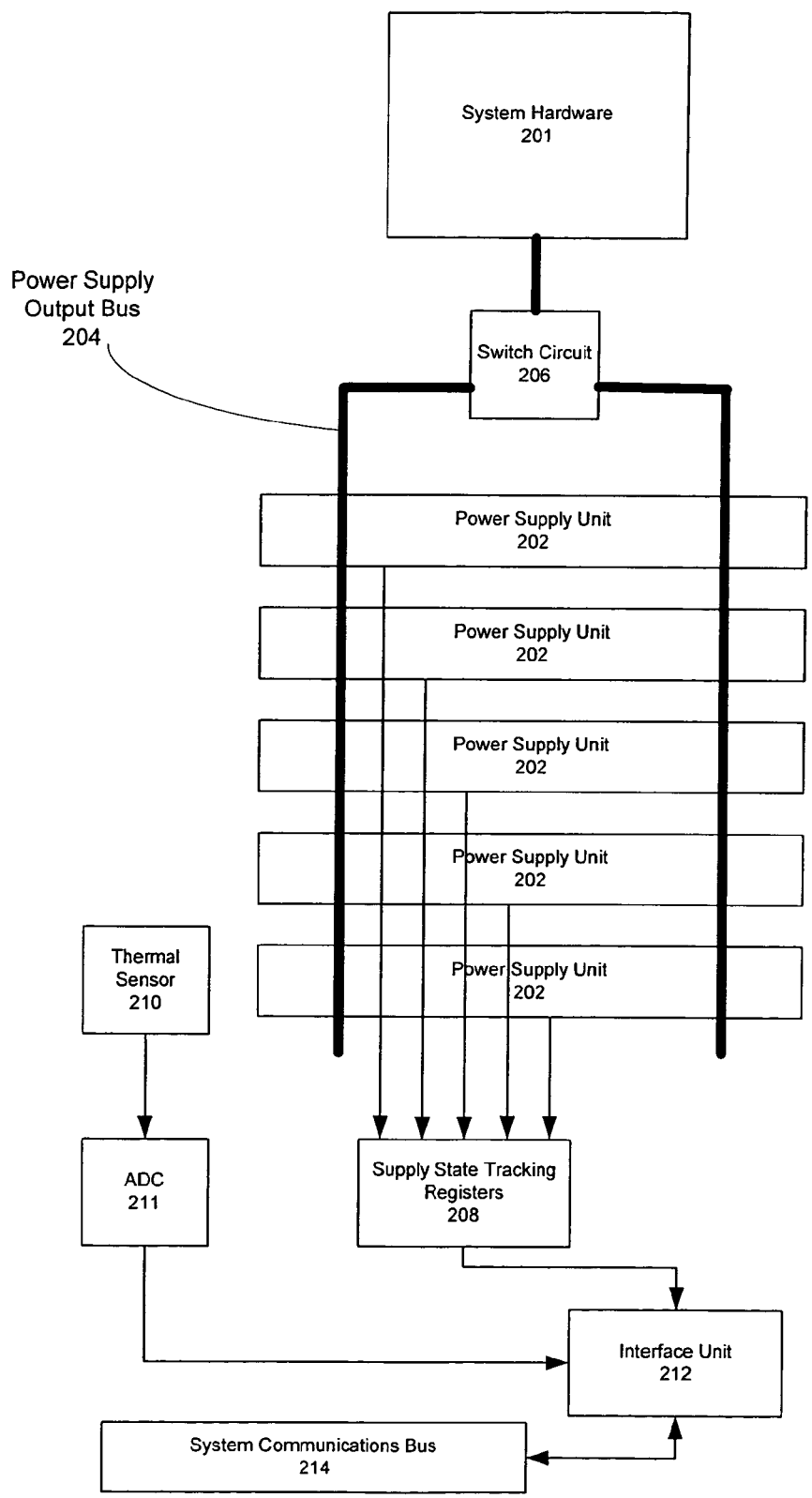
FIG. 2 is a schematic diagram depicting an apparatus for dynamic temperature-adjusted power redundancy in accordance with an embodiment of the invention.

FIG. 2 is a schematic diagram depicting an apparatus for dynamic temperature-adjusted power redundancy in accordance with an embodiment of the invention. The apparatus, in the configuration shown, comprises a power subsystem which provides power to system hardware 201. The power subsystem includes multiple power supply units 202, one or more power supply output bus(es) 204, switch circuit 206, supply state tracking registers 208, thermal sensor 210, analog-to-digital converter 211, interface unit 212, and system communications bus 214.

The system hardware 201 typically comprises computer devices and electronics that require power to operate. For example, the system may comprise a rack with a number of servers or other devices mounted therein. Numerous types of system hardware 201 may be powered redundantly by the power subsystem.

The power supply units 202 may comprise AC-to-DC converters that receive AC power from an external source. Alternatively, they may comprise DC-to-DC converters that receive DC power at one voltage level and convert it to a second voltage level to be utilized by the system hardware 201. The power subsystem is configured with multiple power supply units 202. In one embodiment, each power supply unit 202 may have the same or equivalent output voltage and power supplying capability (wattage capacity).

The power supplies 202 have their outputs coupled to one or more power supply output bus(es) 204. Multiple buses 204 may be utilized for purposes of redundancy. If one of the buses fails, another bus can still route power from the supplies 202 to the target system devices 201. In the example illustrated in FIG. 2, the power subsystem is shown as configured with two such output buses 204. With multiple output buses, power transistors (not shown) may be used as controllable switches to selectively couple the supply units to the bus bars. Hence, for example, if one bus bar becomes shorted, the power supplies may be switched to another bus bar. Instead, a switch circuit 206 may be utilized to couple the power supply output buses 204 to the system hardware 201. In one implementation, the switch circuit 206 may be configured to controllably switch either output bus bar 204 so that current is directed from that bus bar to the system hardware 201.

The supply state tracking registers 208 are coupled to the power supply units 202. The status or state of each of the supplies 202 may be communicated to and kept in the registers 208. In one embodiment, each supply may be in either an up state (supplying power), a down state (not supplying power), or a fault state (not functioning properly).

The thermal sensor 210 is included as part of the power subsystem in accordance with an embodiment of the invention. The thermal sensor 210 may comprise, for example, a type of contact temperature sensor, such as a thermocouple or a thermistor. The thermal sensor 210 need not be placed in contact with the power supply units if an ambient temperature is measured.

The analog-to-digital converter (ADC) 211 may be coupled to receive an analog output signal from the thermal sensor 210 and to convert the analog output signal to digital temperature data. The digital temperature data may then be output by the ADC 211 to the interface unit 212. Although the ADC 211 is shown separately from the thermal sensor 210, the ADC 211 may also be incorporated as part of the thermal sensor device 210.

The interface unit 212 comprises a subsystem that is configured to receive the temperature data from the ADC 212 and the status data from the supply state tracking registers 208. The data may be kept in a register set within the interface unit 212. The interface unit 212 may be coupled to a system communications bus 214 and may be configured to make available and communicate the data to a computer system by way of the bus 214. The computer system may include a user interface that allows a user to monitor the status of the power subsystem. In addition, the local computer system may be configured to communicate the data and information to a remote computer system for remote monitoring of the status of the power subsystem.

Figure 3:
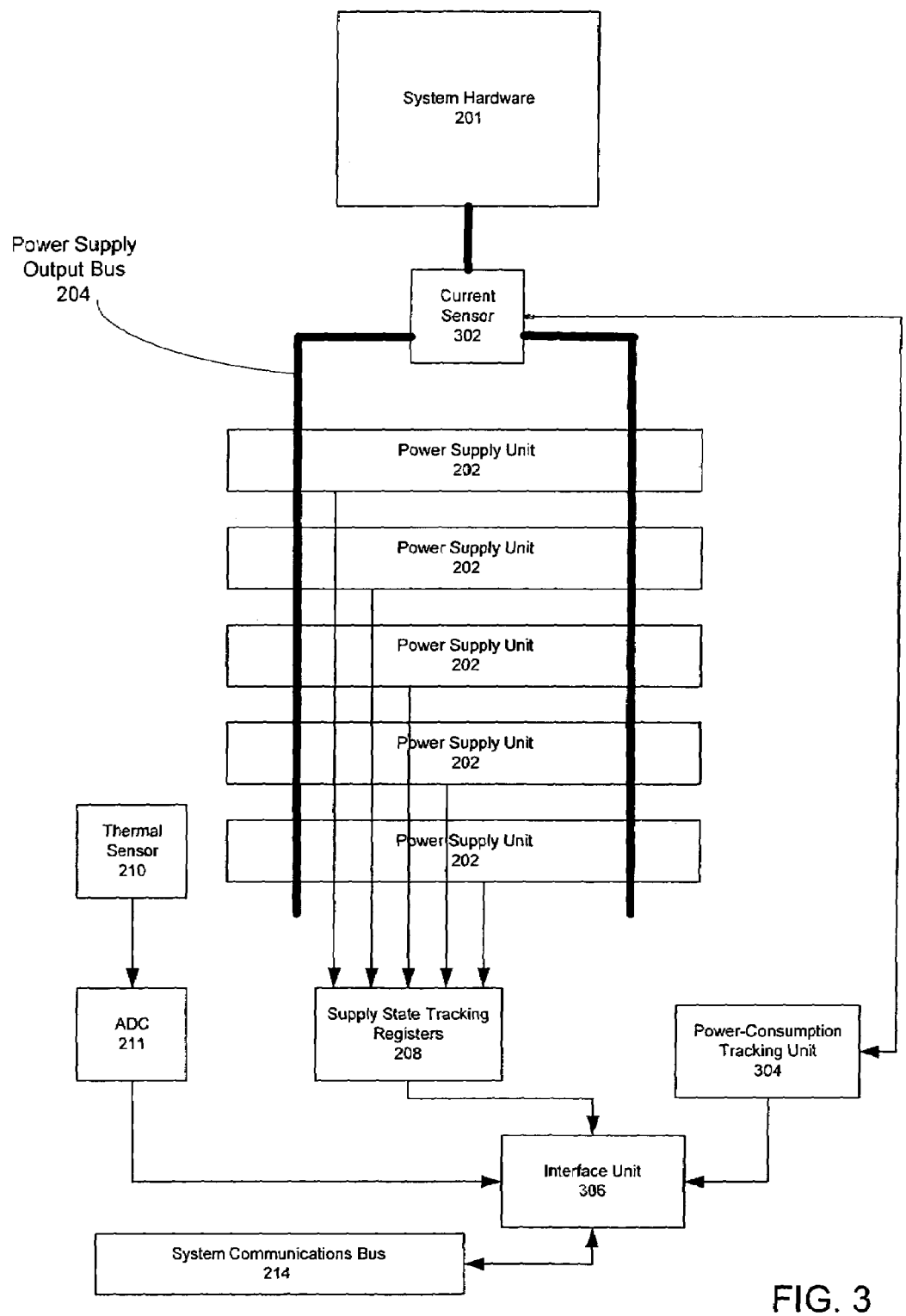
FIG. 3 is a schematic diagram depicting an apparatus for dynamic temperature-adjusted power redundancy with online current measurement in accordance with an embodiment of the invention.

FIG. 3 is a schematic diagram depicting an apparatus for dynamic temperature-adjusted power redundancy with online current measurement in accordance with an embodiment of the invention. In comparison to the apparatus of FIG. 2, the apparatus of FIG. 3 adds online current measurement capability.

In the apparatus of FIG. 3, a current sensor or current sense unit 302 is included in the power subsystem. The current sensor 302 may be configured such that it measures the electrical current going through it to power the system hardware 201. The current sensor 302 may comprise an in-line type device where all current to the system hardware 201 flows through the device. Alternatively, the current sensor 302 may comprise a passive type device, such as a magnetic-based current sensor wrapped around a bus bar leading to the system hardware. The current sensor 302 outputs the current measurement signal to the power-consumption tracking unit 304. If multiple power supply output buses 204 are used, then the current sense unit 302 may also be configured to include circuitry (such as switches) to electrically isolate the bus bars from each other so that if an electrical short on one bus bar does not result in shorting all the bus bars.

The power-consumption tracking unit 304 may include an analog-to-digital converter (ADC) that is configured to receive the current measurement signal and to convert the analog signal to digital data. The power-consumption tracking unit 304 may also include logic that calculates one or more measures from the current measurement data. For example, the logic may be configured to determine a peak or maximum current drawn by the system hardware over a specified period of time. The specified period of time may comprise, for example, the preceding 24 hours, the preceding week, or some other period of time. The logic may also be configured calculate other dynamic statistical measures, such as an average current drawn by the system hardware over a period of time. In addition to receiving the temperature data and the power supply status data, the interface unit 306 is configured to receive information from the power-consumption tracking unit 304.

Figure 4:
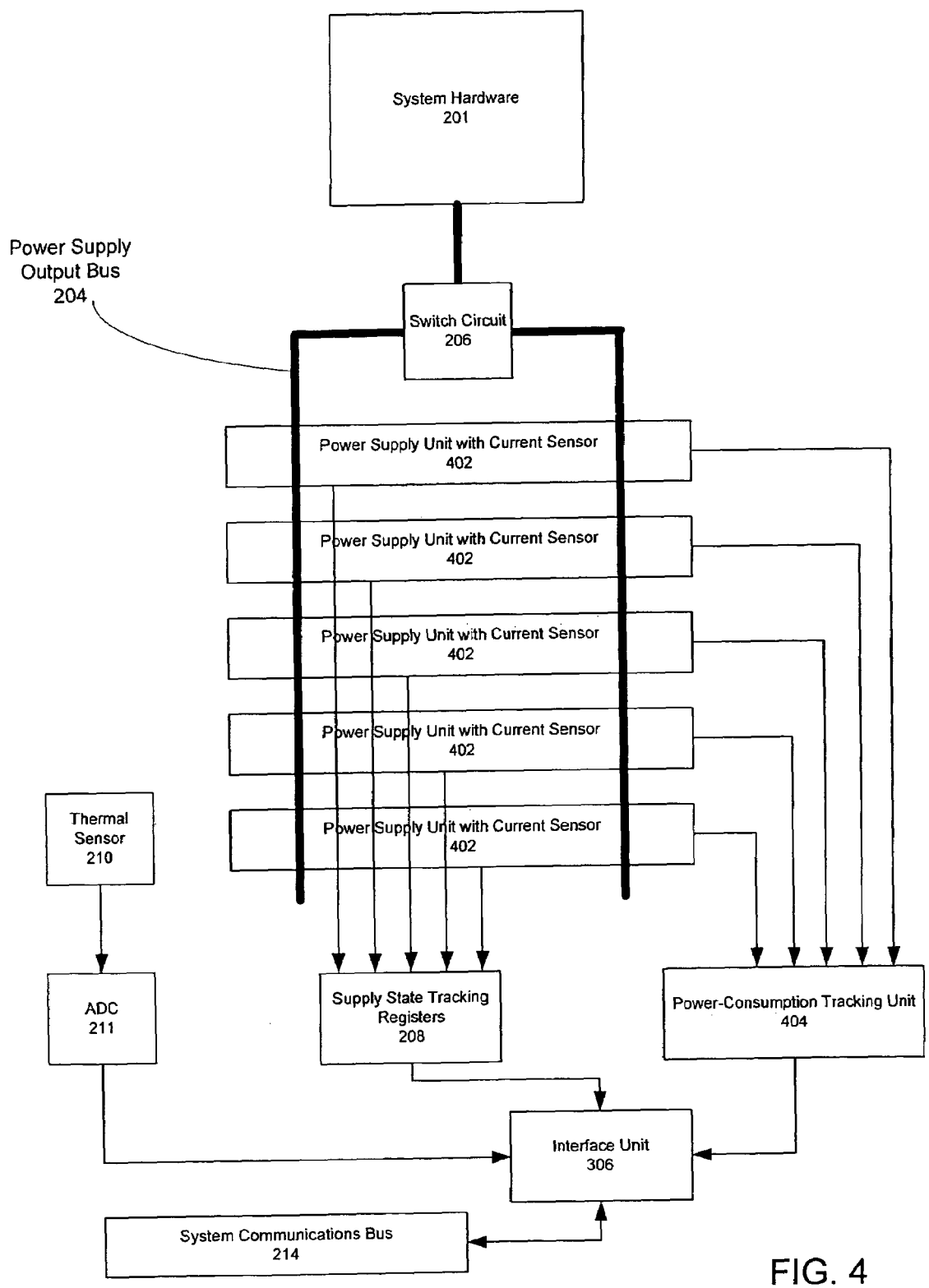
FIG. 4 is a schematic diagram depicting an alternate configuration of an apparatus for dynamic temperature-adjusted power redundancy with online current measurement in accordance with an embodiment of the invention.

FIG. 4 is a schematic diagram depicting an alternate configuration of an apparatus for dynamic temperature-adjusted power redundancy with online current measurement in accordance with an embodiment of the invention. The apparatus is similar to the one described in relation to FIG. 3 with some differences.

In the apparatus of FIG. 4, each power supply unit 402 includes a current sensor. The current sensor measures the electrical current provided by that power supply unit 402. With current sensors embedded in the power supply units, a separate current sensing unit 302 is not necessary. Instead, a switch circuit 206 may be utilized to couple the power supply output buses 204 to the system hardware 201.

The power-consumption tracking unit 404 may include an analog-to-digital converter (ADC) that is configured to receive the multiple current measurement signals from the various supplies 402 and to convert each analog signal to digital data. The consumption tracking unit 404 may also include logic that sums together the current measurement data from the various supplies 402 to generate a total measure of the current supplied to the system hardware 201. The consumption tracking unit 402 may also include logic that calculates one or more measures from the data. For example, the logic circuitry may be configured or programmed to determine a peak or maximum current supplied to the system hardware over a specified period of time. The specified period of time may comprise, for example, the preceding 24 hours, the preceding week, or some other period of time. The logic may also be configured or programmed to calculate other dynamic statistical measures, such as an average current supplied to the system hardware over a period of time.

Figure 5:
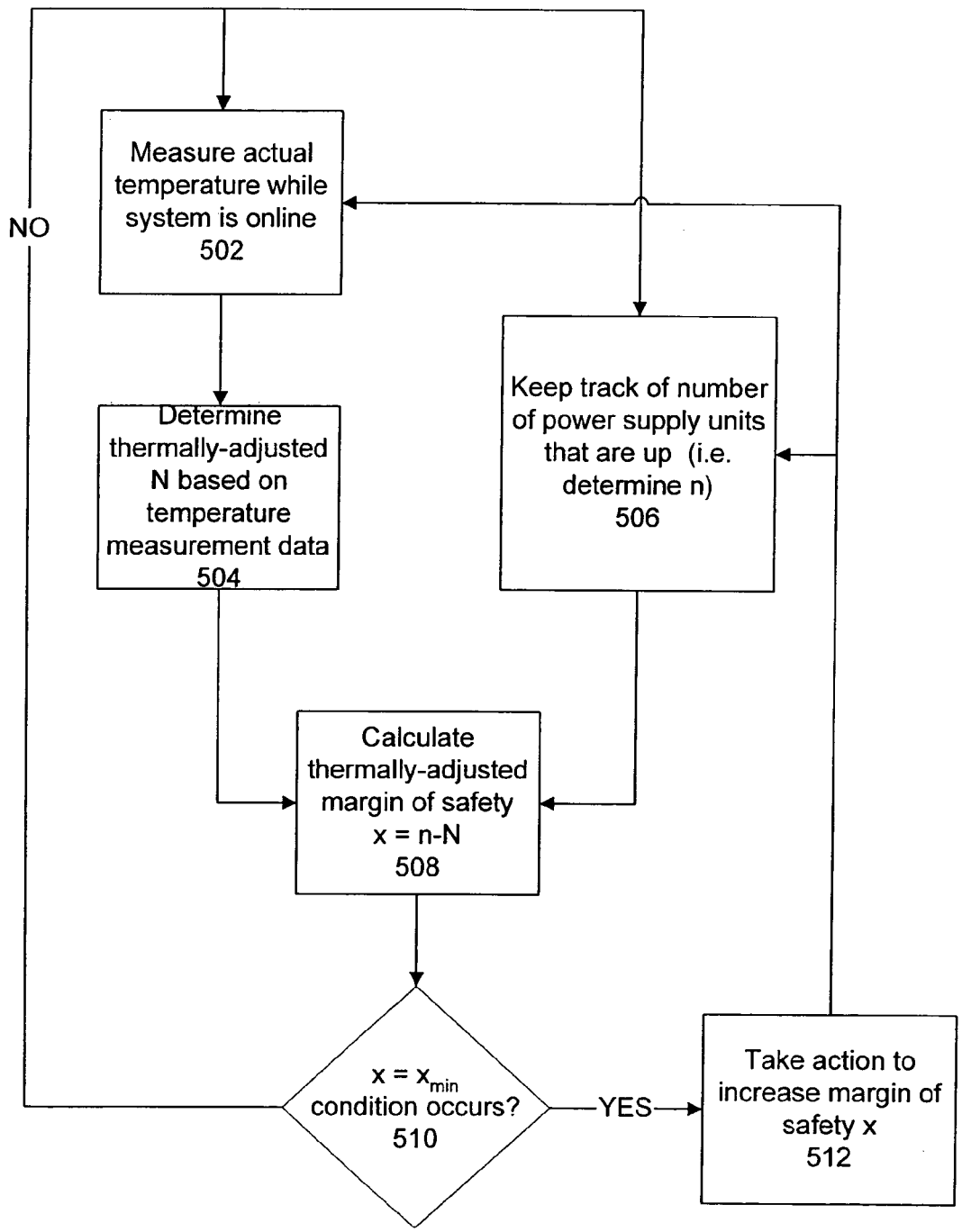
FIG. 5 is a flow chart depicting a method of operating and maintaining a power subsystem with dynamic temperature-adjusted power redundancy in accordance with an embodiment of the invention.

FIG. 5 is a flow chart depicting a method of operating and maintaining a power subsystem with dynamic temperature-adjusted power redundancy in accordance with an embodiment of the invention. After being configured, the power subsystem is used to power the system hardware. While the system is online, the actual temperature of the system is measured 502. For example, a thermal sensor 210, such as in FIG. 2, may be utilized. The signal from the thermal sensor 210 may be converted to digital temperature data using an ADC 211.

Based on the temperature data, a temperature-adjusted (thermally-adjusted) determination 504 is made of N, wherein N comprises the number of power supplies needed to power the system hardware (rounding up, but without redundancy). The dynamic determination may be made using logic circuitry, for example, in the interface unit 212 of FIG. 2. In one implementation, N is dynamically calculated using the following formula.

$$N = \mathrm{round\_up}(\mathrm{PEAK\_CURRENT\_DRAW}/\mathrm{ADJ\_MAX\_CURRENT\_PER\_SUPPLY})$$

PEAK_CURRENT_DRAW represents the maximum current drawn by the system hardware over a specified period of time. This may be predetermined at design time for the system, or it may be dynamically determined, for example, as described below in relation to FIGS. 3 and 4. ADJ_MAX_CURRENT_PER_SUPPLY represents the temperature-adjusted maximum current that each power supply is capable of providing. ADJ_MAX_CURRENT_PER_SUPPLY is a function of the ambient temperature in which the power subsystem is operating. This number is dynamic, as it changes based on the temperature of the current operating environment. Per the equation, PEAK_CURRENT_DRAW is divided by ADJ_MAX_CURRENT_PER_SUPPLY. Finally, round_up represents the function of rounding up to the nearest integer to obtain N.

In addition to the above temperature-adjusted calculation, the number of power supplies that are presently up, referred to as "n," is also dynamically tracked 506. Keeping track of n may be performed, for example, using the supply state tracking registers 208 described above in relation to FIG. 2.

In accordance with an embodiment of the invention, using the above values for N and n, a temperature-adjusted (thermally-adjusted) margin of safety, referred to as "x," may be calculated 508. The calculation of x may be accomplished using logic circuitry within the power subsystem and may be performed in accordance with this equation: $x = n - N$. Given a particular thermal environment, the temperature-adjusted margin of safety x represents the number of power supplies that may be lost before reaching N. In other words, the temperature-adjusted margin of safety x represents the present number of "extra" power supplies which are up at a particular time and which provide the redundancy of the power subsystem in the particular thermal environment.

In one embodiment, if the temperature-adjusted margin of safety x reaches 510 a minimum acceptable level $x_{min}$, then an alarm or alert signal may be generated. The alert signal may indicate that intervening action is to be taken 512 to increase the margin of safety. Otherwise, the method keeps on dynamically tracking N and n. In one implementation, $x_{min}$ may be set to zero such that $x = x_{min}$ when an $n = N$ condition occurs. In another implementation, $x_{min}$ may be set to be one, two, or more such that $x = x_{min}$ when an $n = N + x_{min}$ condition occurs. The action taken 512 may comprise, for example, hot swapping or cold swapping of a failed component. In some circumstances, the action taken may be to add one or more power supplies to the power subsystem.

The above-described apparatus and method should advantageously results in less intervention (reducing the cost of system ownership) and potentially greater system uptime. For example, the thermal adjustment of N may increase the margin of safety x. If the margin of safety x increases, for example, from one to two power supply units, then less intervention is required because it is far less likely for two power supplies to fail over the life of a system box than it is for just one to fail.

If the probability that a single power supply will fail over the lifetime of the box is defined as "p," then the probability that x supplies will fail over the lifetime of the box should be p raised to the x power. Consider a hypothetical example where p=0.01=1% and x=2. In this case, assuming the power subsystem is configured with $x_{min}$=0, then the probability that action will need to be taken 512 becomes $p^2$=0.0001=0.01%. In contrast, without the invention, the margin of safety may be only one power supply unit because the cooled environment was not taken into account in the calculation of N. The probability that action would need to be taken in that case would be p=1%.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of providing dynamic temperature-adjusted power redundancy for a system, the method comprising:
   tracking a number of power supply units, n, that are presently in an up state;
   measuring a temperature in which the power supply units are operating; and
   determining dynamically a temperature-adjusted number of power supply units, N, that are presently needed to supply power to the system.

2. The method of claim 1, further comprising:
   generating an action alert to increase a margin of safety corresponding to a difference between n and N if the margin of safety reaches a minimum acceptable level.

3. The method of claim 1, wherein N is calculated by dividing a peak current drawn by the system by a temperature-adjusted maximum current per power supply and rounding up.

4. The method of claim 3, further comprising:
   measuring an actual electrical current used while the system is online to generate an analog current measurement signal;
   converting the current measurement signal to digital current measurement data; and
   utilizing the current measurement data to dynamically determine the peak current drawn by the system.

5. The method of claim 1, wherein the tracking of n is performed using supply state tracking registers coupled to the power supply units.

6. The method of claim 2, wherein the minimum acceptable level for the margin of safety comprises zero power supply units.

7. The method of claim 2, wherein the minimum acceptable level for the margin of safety comprises more than zero power supply units.

8. The method of claim 2, wherein the action taken comprises hot swapping of a failed component.

9. The method of claim 2, wherein the action taken comprises cold swapping of a failed component.

10. An apparatus for providing power redundantly to a system, the apparatus comprising:
    a plurality of power supply units configured to provide power to the system;
    a temperature sensor configured to measure a temperature in which the power supply units are operating; and
    logic circuitry configured to use the measured temperature to dynamically calculated a temperature-adjusted number of power supply units, N, that are presently needed to supply power to the system.

11. The apparatus of claim 10, further comprising:
    supply state tracking registers coupled to the power supply units and configured to hold a state variable for each said supply unit.

12. The apparatus of claim 11, wherein the supply state tracking registers are utilized in tracking a number of power supply units, n, that are presently in an up state.

13. The apparatus of claim 12, further comprising:
    a current sensor configured to measure an electrical current drawn by the system,
    wherein the measured current is also used in the dynamic calculation of N.

14. The apparatus of claim 13, wherein if a margin of safety corresponding to a difference between n and N reaches a minimum acceptable level, then an alert is generated to take intervening action to increase the margin of safety.

15. The apparatus of claim 11, further comprising:
    an output bus bar is coupled to multiple power supply units.

16. The apparatus of claim 15, wherein the current sensor comprises a device coupled to the output bus bar.

17. The apparatus of claim 16, wherein the device comprises an in-line current measuring device.

18. The apparatus of claim 16, wherein the device comprises a passive current measuring device.

19. The apparatus of claim 11, wherein current sensors are integrated with the power supply units.

20. A power subsystem for providing power redundantly to system hardware, the power subsystem comprising:
    circuitry for tracking a number of power supply units, n, that are presently in an up state;
    a thermal sensor configured to measure a temperature in which the power supply units are operating; and
    means for determining dynamically a temperature-adjusted number of power supply units, N, that are presently needed to supply power to the system.

* * * * *